US012260450B2

United States Patent
Berger et al.

(10) Patent No.: US 12,260,450 B2
(45) Date of Patent: *Mar. 25, 2025

(54) PERSONALIZED TRY-ON ADS

(71) Applicant: Snap Inc., Santa Monica, CA (US)

(72) Inventors: Itamar Berger, Hod Hasharon (IL); Gal Dudovitch, Tel Aviv (IL); Ma'ayan Mishin Shuvi, Givatayim (IL)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,420

(22) Filed: Nov. 9, 2023

(65) Prior Publication Data
US 2024/0070766 A1      Feb. 29, 2024

Related U.S. Application Data

(63) Continuation of application No. 17/305,909, filed on Jul. 16, 2021, now Pat. No. 11,854,069.

(51) Int. Cl.
*G06Q 30/0601* (2023.01)
*G06N 3/08* (2023.01)
(Continued)

(52) U.S. Cl.
CPC .......... *G06Q 30/0643* (2013.01); *G06N 3/08* (2013.01); *G06Q 30/0271* (2013.01);
(Continued)

(58) Field of Classification Search
CPC .......... G06Q 30/0643; G06Q 30/0271; G06Q 30/0276; G06N 3/08; G06V 40/103; G06V 40/161
See application file for complete search history.

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 109863532 A | 6/2019 |
| CN | 110168478 A | 8/2019 |

(Continued)

OTHER PUBLICATIONS

Lassner et al. "A generative model of people in clothing." In Proceedings of the IEEE international conference on computer vision, pp. 853-862. 2017 (Year: 2017).*

(Continued)

*Primary Examiner* — Resha Desai
*Assistant Examiner* — Patrick Kim
(74) *Attorney, Agent, or Firm* — SCHWEGMAN LUNDBERG & WOESSNER, P.A.

(57) ABSTRACT

Methods and systems are disclosed for performing operations comprising: accessing content received from a first client device associated with a first user; processing the content to identify a first image that depicts the first user wearing a first fashion item; determining a first pose of the first user depicted in the first image; searching a plurality of products to identify a first product that corresponds to the first pose of the first user depicted in the first image and that includes one or more attributes associated with the first fashion item; modifying the first image to generate an advertisement that depicts the first user wearing the first product; and during a content browsing session being accessed by the first client device, causing the advertisement that depicts the first user wearing the first product to be displayed automatically on the first client device.

20 Claims, 12 Drawing Sheets

(51) Int. Cl.
*G06Q 30/0241* (2023.01)
*G06Q 30/0251* (2023.01)
*G06V 40/10* (2022.01)
*G06V 40/16* (2022.01)

(52) U.S. Cl.
CPC ....... *G06Q 30/0276* (2013.01); *G06V 40/103* (2022.01); *G06V 40/161* (2022.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,708,434 B1 | 7/2020 | Scheet et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0066750 A1* | 3/2013 | Siddique ............... G06Q 20/12 705/27.2 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0035913 A1* | 2/2014 | Higgins ............ G06Q 30/0641 345/420 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |

(56) References Cited

U.S. PATENT DOCUMENTS

| | | |
|---|---|---|
| 2015/0206349 A1 | 7/2015 | Rosenthal et al. |
| 2015/0302505 A1* | 10/2015 | Di .................... G06V 40/10 |
| | | 705/26.7 |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0035007 A1* | 1/2019 | Yepez .................... G06Q 50/01 |
| 2019/0043203 A1* | 2/2019 | Fleishman .............. G06F 18/29 |
| 2019/0057616 A1 | 2/2019 | Cohen et al. |
| 2019/0080207 A1 | 3/2019 | Chang et al. |
| 2019/0188920 A1 | 6/2019 | Mcphee et al. |
| 2021/0103970 A1* | 4/2021 | Sollami .................... G06T 7/70 |
| 2021/0117712 A1* | 4/2021 | Huang .................... G06F 3/011 |
| 2021/0182913 A1 | 6/2021 | Hwang |
| 2022/0230344 A1* | 7/2022 | Singhal .................... G06T 7/174 |
| 2023/0020218 A1 | 1/2023 | Berger et al. |

FOREIGN PATENT DOCUMENTS

| | | |
|---|---|---|
| EP | 2184092 A2 | 5/2010 |
| EP | 3125154 A1 | 2/2017 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2023287907 A1 | 1/2023 |

OTHER PUBLICATIONS

"U.S. Appl. No. 17/305,909, Advisory Action mailed Jun. 12, 2023", 3 pgs.

"U.S. Appl. No. 17/305,909, Final Office Action mailed Apr. 3, 2023", 38 pgs.

"U.S. Appl. No. 17/305,909, Non Final Office Action mailed Dec. 28, 2022", 28 pgs.

"U.S. Appl. No. 17/305,909, Notice of Allowance mailed Aug. 11, 2023", 15 pgs.

"U.S. Appl. No. 17/305,909, Response filed Feb. 28, 2023 to Non Final Office Action mailed Dec. 28, 2022", 14 pgs.

"U.S. Appl. No. 17/305,909, Response filed May 30, 2023 to Final Office Action mailed Apr. 3, 2023", 14 pgs.

"International Application Serial No. PCT/US2022/037001, International Search Report mailed Oct. 18, 2022", 5 pgs.

"International Application Serial No. PCT/US2022/037001, Written Opinion mailed Oct. 18, 2022", 7 pgs.

Raj, Amit, et al., "SwapNet: Image Based Garment Transfer", Pattern Recognition: 5th Asian Conference, ACPR 2019, Auckland, NZ, Nov. 26-29, 2019, Revised Selected Papers, Part II; [Lecture Notes in Computer Science], Springer, Cham, (Oct. 6, 2018), 679-695.

U.S. Appl. No. 17/305,909, filed Jul. 16, 2021, Personalized Try-On Ads.

"International Application Serial No. PCT/US2022/037001, International Preliminary Report on Patentability mailed Jan. 25, 2024", 9 pgs.

* cited by examiner

__PERSONALIZED TRY-ON ADS__

PRIORITY CLAIM

This application is a continuation of U.S. patent application Ser. No. 17/305,909, filed on Jul. 16, 2021, which is hereby incorporated by reference in its entirety.

TECHNICAL FIELD

The present disclosure relates generally to providing augmented reality experiences using a messaging application.

BACKGROUND

Augmented Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
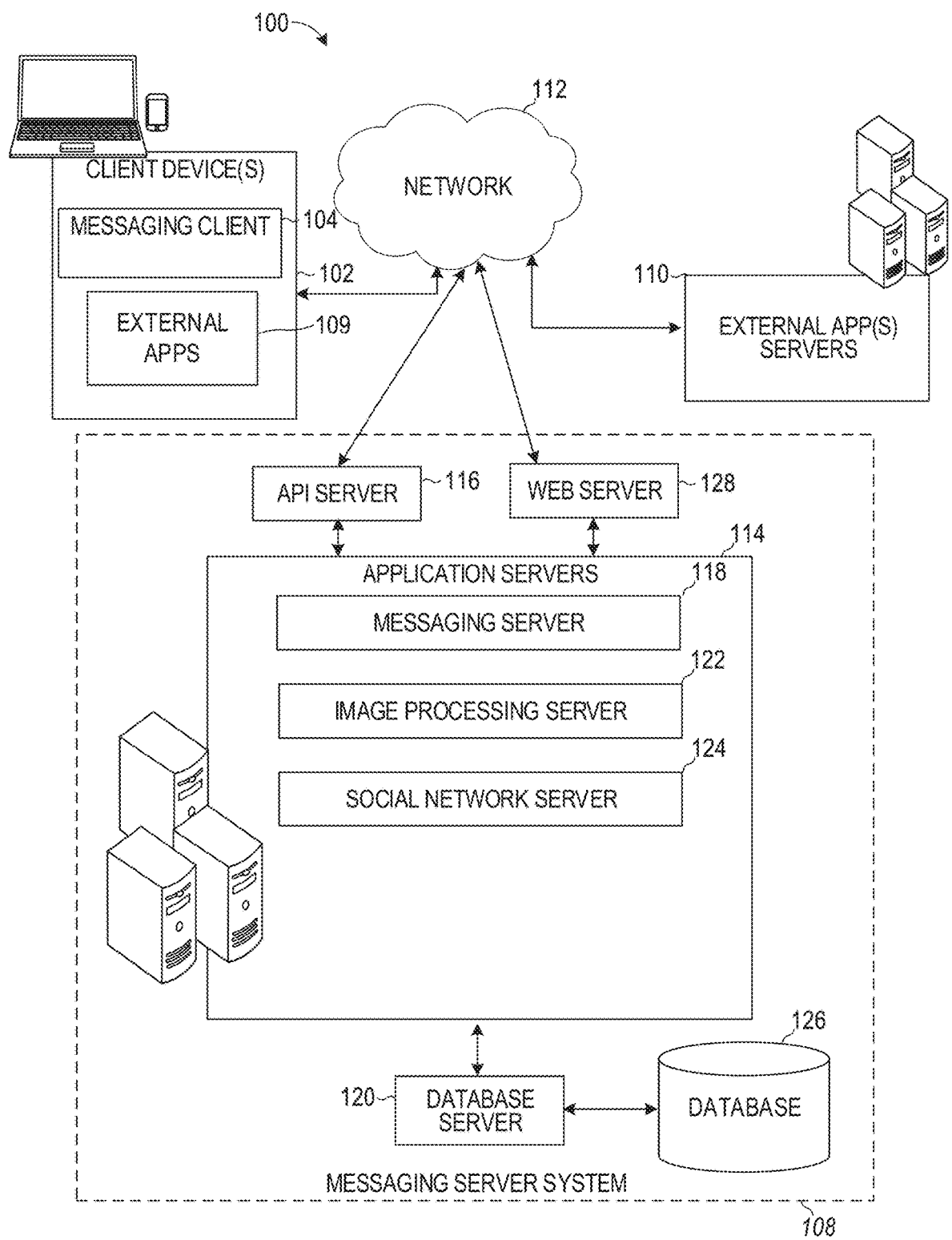
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display modified images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems eliminate the need to use depth sensors to modify images. For example, certain systems allow users to replace a background in a videoconference in which a face of the user is detected. Specifically, such systems can use specialized techniques that are optimized for recognizing a face of a user to identify the background in the images that depict the user's face. These systems can then replace only those pixels that depict the background so that the real-world background is replaced with an alternate background in the images. Such systems, though, are incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions are belonging to the background rather than the foreground of the images. Also, such systems fail to properly replace the background when more than one user is depicted in the image or video feed. Because such systems are incapable of distinguishing a whole body of a user in an image from a background, these systems are also unable to apply visual effects to certain portions of a user's body, such as articles of clothing.

Advertising systems are always seeking new ways to engage with a user and particularly they seek new ways to sell various products. Typically, such advertisements are presented to users in generic form and include a very small amount, if any, of personalized information. Sometimes, advertisers select products to advertise based on preferences of users. While these systems generally work well, they lack the ability to form a unique bond with a target user because the advertisements are generic to any user they are presented to, which limits their overall engagement with the user.

The disclosed techniques improve the efficiency of using the electronic device by generating personalized advertisements that depict a target user wearing a given product, such as a fashion item. By creating a unique advertisement that is specific to each user to whom the advertisement is presented, the disclosed techniques can improve the overall engagement the advertisements have on the targeted users and increase the likelihood of selling an advertised product. Namely, the user can be browsing content on a messaging application and can be presented automatically with an advertisement that depicts the user wearing an advertised product. This can instantly draw the user's attention to the advertisement as the user recognizes themselves in the advertisement and increases the likelihood that the user will engage with the advertisement.

Specifically, the disclosed techniques access content received from a first client device associated with a first user and process the content to identify a first image that depicts the first user wearing a first fashion item. The first fashion item can be a t-shirt or other garment worn by the first user. The disclosed techniques determine a first pose of the first user depicted in the first image. The disclosed techniques search a plurality of products, such as various t-shirt garments being sold by a given merchant, to identify a first product that corresponds to the first pose of the first user depicted in the first image and that includes one or more attributes associated with the first fashion item. The disclosed techniques modify the first image to generate an advertisement that depicts the first user wearing the first product, such as by replacing the t-shirt being worn by the user in the first image with a t-shirt product being advertised. The disclosed techniques, during a content browsing session being accessed by the first client device, cause the advertisement that depicts the first user wearing the first product to be displayed automatically on the first client device. As used herein, article of clothing and garment are used interchangeably and should be understood to have the same meaning.

In this way, the disclosed techniques provide unique and meaningful advertisements to users, which increases the overall engagement a user can have with the advertisements. This improves the overall experience of the user in using the electronic device. Also, by performing such segmentations without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of an augmentation system 208. Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video).

Figure 3:
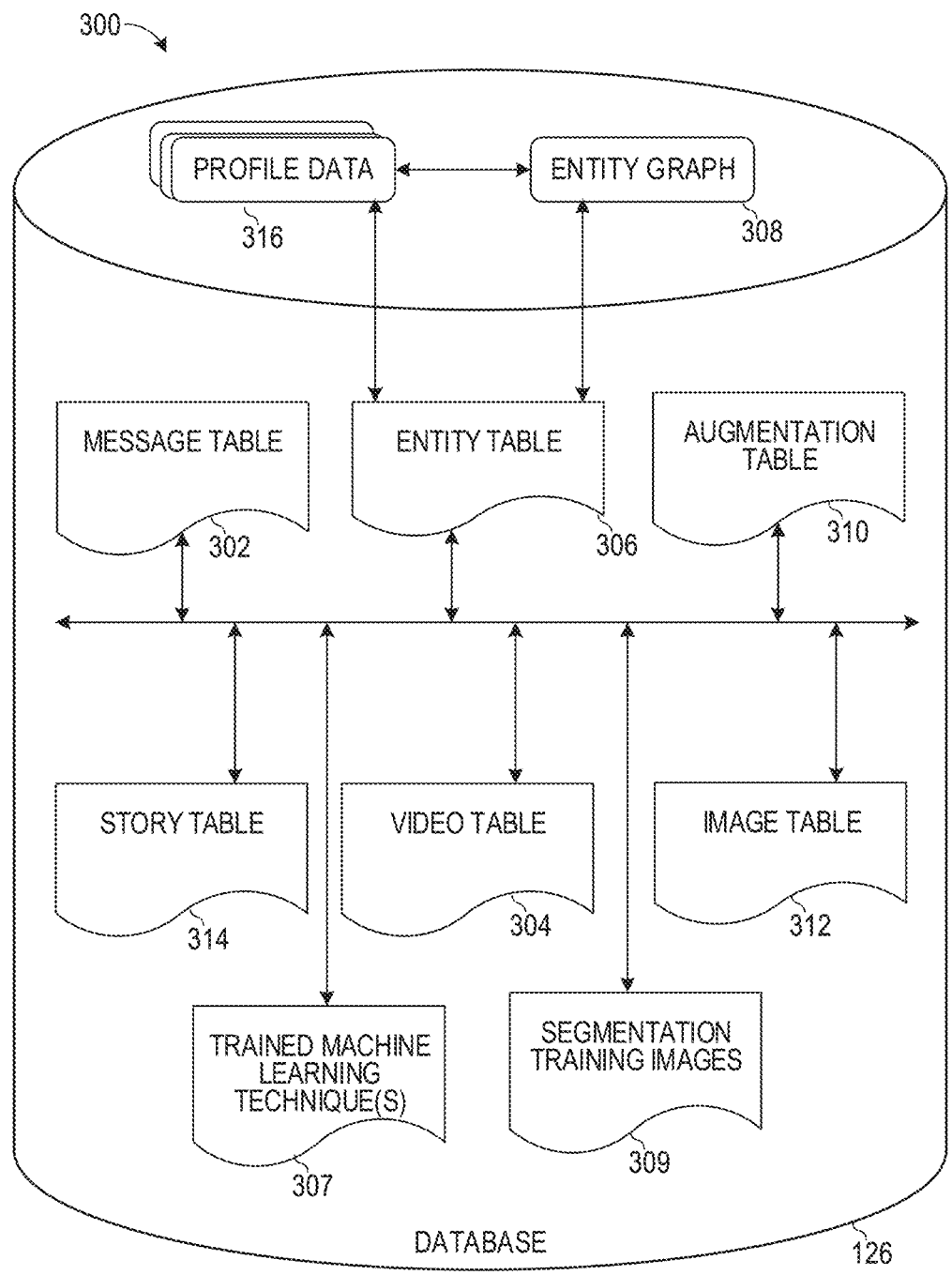
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users in a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
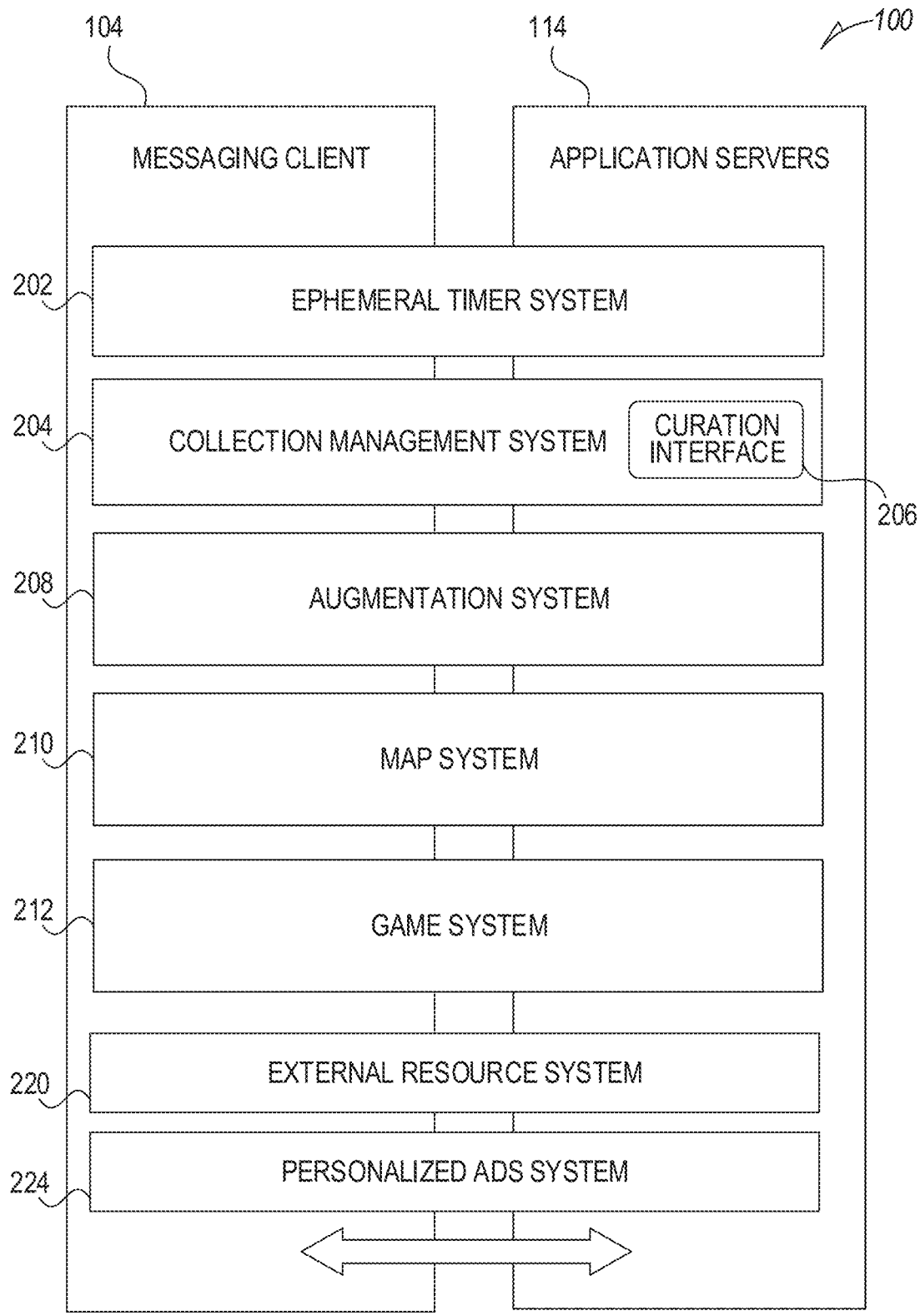
FIG. 2 is a diagrammatic representation of a messaging client application, in accordance with some examples.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display)

to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 106. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as used by the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (GUI) (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A personalized ADS (advertisements) system 224 accesses a set of images or content received from a client device 102 and selects a given image or plurality of images to use to generate an advertisement. Particularly, the personalized ADS system 224 determines a pose of a user depicted in the given image and searches a plurality of products to identify a product that corresponds to the pose of the user and that includes one or more attributes associated with a fashion item worn by the user in the given image. The personalized ADS system 224 modifies the given image to generate the advertisement that depicts the user wearing the product and automatically presents the advertisement to the user during a content browsing session. An illustrative implementation of the personalized ADS system 224 is shown and described in connection with FIG. 5 below.

Specifically, the personalized ADS system 224 is a component that can be accessed by an AR/VR application implemented on the client device 102. The AR/VR application uses an RGB camera to capture a monocular image of a user and the garment or garments worn by the user. The AR/VR application applies various trained machine learning techniques on the captured image of the user wearing the garment and one or more previous frames depicting the user wearing the same garment to segment the garment (e.g., a shirt, jacket, pants, dress, and so forth) worn by the user in the image and to apply one or more visual effects to the captured image. Segmenting the garment results in an outline of the borders of the garment that appear in the image or video. Pixels within the borders of the segmented garment correspond to the garment or clothing worn by the user. The segmented garment is used to distinguish the clothing or garment worn by the user from other objects or elements depicted in the image, such as parts of the user's body (e.g., arms, head, legs, and so forth) and the background of the image. In some implementations, the AR/VR application continuously captures images of the user wearing the garment in real time or periodically to continuously or periodically update the applied one or more visual effects. This allows the user to move around in the real world and see the one or more visual effects update in real time.

In order for the AR/VR application to apply the one or more visual effects directly from a captured RGB image, the AR/VR application obtains a first trained machine learning technique from the personalized ADS system 224. The first trained machine learning technique processes the captured RGB image to generate a segmentation from the captured image that corresponds to the garment worn by the user(s) depicted in the captured RGB image. While this disclosure discusses application of the personalized ADS system 224 to segment a garment worn by a single user, the disclosure is similarly applicable to detecting and segmenting multiple garments worn by respective multiple users depicted simultaneously in the same image to apply respective visual effects to their garments.

In training, the personalized ADS system 224 obtains a first plurality of input training images that include depictions of one or more users wearing different garments. These training images also provide the ground truth information about the segmentations of the garments worn by the users depicted in each image. A first machine learning technique (e.g., a deep neural network) is trained based on features of the plurality of training images. Specifically, the first machine learning technique extracts one or more features from a given training image and estimates a segmentation of the garment worn by the user depicted in the given training image. The first machine learning technique obtains the ground truth information corresponding to the training image and adjusts or updates one or more coefficients to improve subsequent estimations of segmentations of the garment.

In some examples, the personalized ADS system 224 receives or accesses a set of products to be advertised to a user. The personalized ADS system 224 searches content previously received from the client device 102 to identify a given image or set of images that include a depiction of the user in a pose or wearing a fashion item that matches the set of products. The personalized ADS system 224 then modifies the given image or set of images to generate a personalized advertisement that depicts the user in the given image or set of images wearing a given product in the set of products. The advertisement can be presented to the user during a content browsing session, such as interstitially between two videos or in a mosaic display of a plurality of images or videos.

For example, the client device 102 can present to the user a first video in a sequence of videos or playlist of videos. After the first video ends (or in response to receiving input from the client device 102 to skip the first video), the personalized ADS system 224 obtains a previously generated personalized advertisement (featuring the user wearing a given product being advertised). The personalized ADS system 224 automatically (without receiving a request from the user to view an advertisement) displays the personalized advertisement for a specified period of time (e.g., 5 seconds). Then, after the specified period of time, the personalized ADS system 224 automatically displays a second video in the sequence of a playlist of videos.

As another example, the client device 102 can present a set of media items (videos or images) in a mosaic display. For example, one row can present a first set of media items and another row under the first set of media items can present a second set of media items. The client device 102, within this mosaic display, can select and position a display of a personalized advertisement (featuring the user wearing a given product being advertised). This makes it appear to the user as if the personalized advertisement is part of the media items in the mosaic display. The client device 102 can receive input from the user selecting the personalized advertisement and, in response, can present a full screen view of the personalized advertisement (featuring the user wearing a given product being advertised).

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect (e.g., graphical element(s)) and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, and the additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can also be changed or distorted by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a GUI displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the personalized ADS system 224. For example, trained machine learning techniques 307 stores the trained parameters of one or more neural network machine learning techniques.

Segmentation training images 309 stores a plurality of images that each depict one or more users wearing different garments. The plurality of images stored in the segmentation training images 309 includes various depictions of one or more users wearing different garments together with segmentations of the garments that indicate which pixels in the images correspond to the garments and which pixels correspond to a background or a user's body parts in the images. Namely the segmentations provide the borders of the garments depicted in the images. These segmentation training images 309 are used by the personalized ADS system 224 to train the first machine learning technique used to generate a segmentation of one or more garments depicted in a received RGB monocular image. In some cases, the segmentation training images 309 include ground truth skeletal key points of one or more bodies depicted in the respective training monocular images to enhance segmentation performance on various distinguishing attributes (e.g., shoulder straps, collar, or sleeves) of the garments. In some cases, the segmentation training images 309 include a plurality of image resolutions of bodies depicted in the images. The segmentation training images 309 can include labeled and unlabeled image and video data. The segmentation training images 309 can include a depiction of a whole body of a particular user, an image that lacks a depiction of any user (e.g., a negative image), a depiction of a plurality of users wearing different garments, and depictions of users wearing garments at different distances from an image capture device.

Data Communications Architecture

Figure 4:
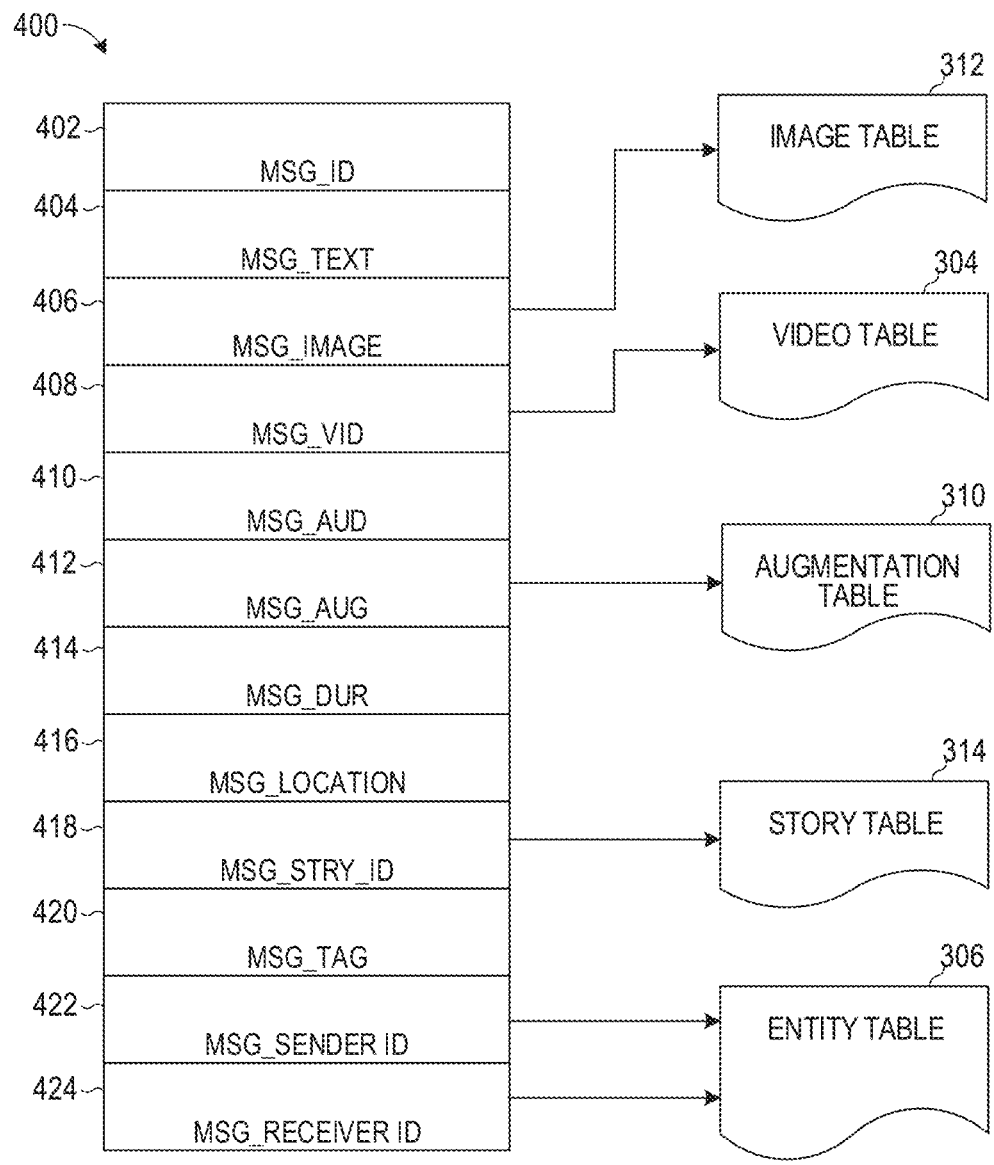
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Personalized Ads System

Figure 5:
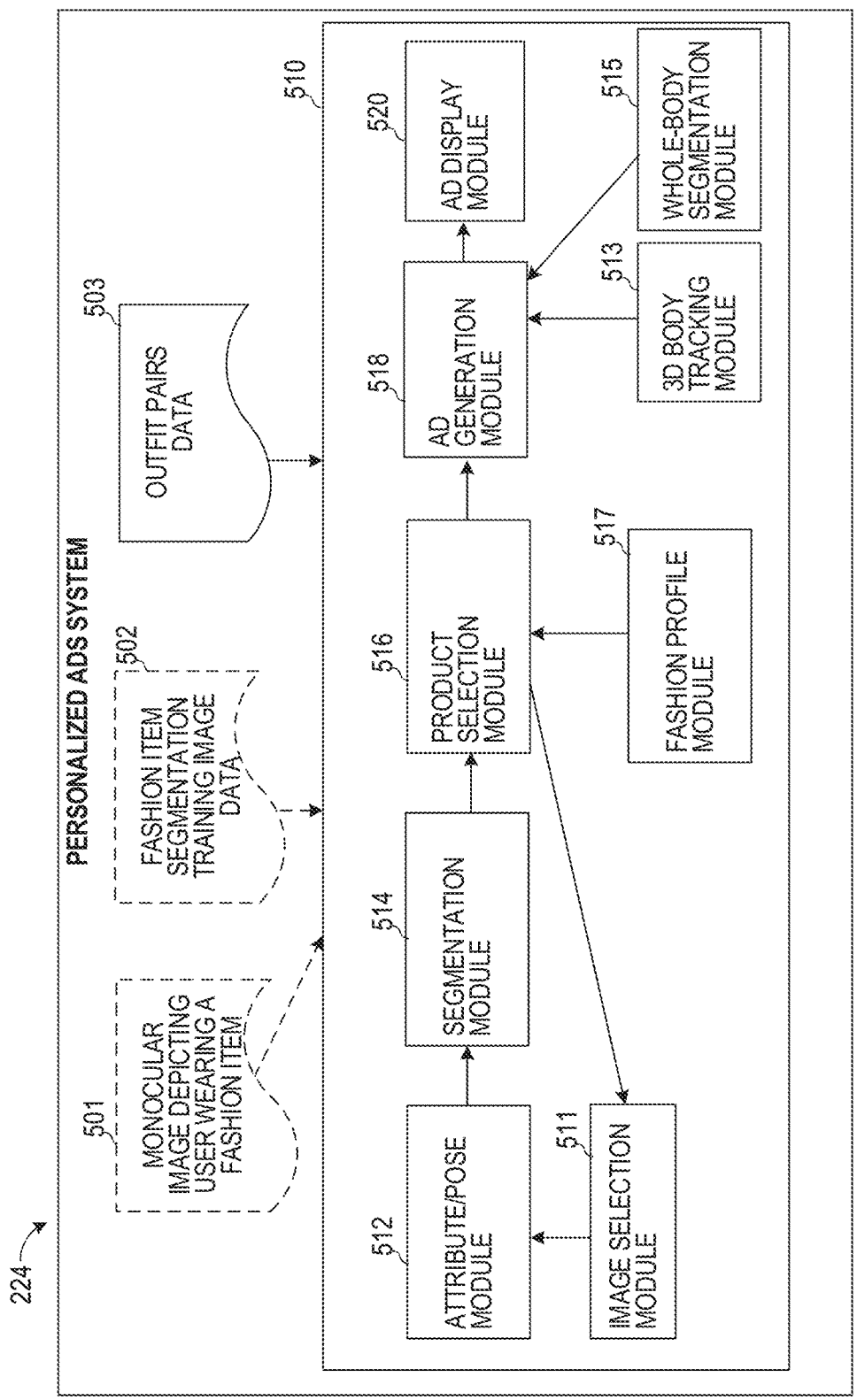
FIG. 5 is a block diagram showing an example personalized advertisement (ad) system, according to example examples.

FIG. 5 is a block diagram showing an example personalized ADS system 224, according to example examples. Personalized ADS system 224 includes a set of components 510 that operate on a set of input data (e.g., a monocular image 501 depicting a real body of a user wearing a garment, fashion item segmentation training image data 502, and outfit pairs data 503). The set of input data can be obtained from data stored in database(s) (FIG. 3) and can be obtained from an RGB camera of a client device 102 when an AR/VR application is being used, such as by a messaging client 104. Personalized ADS system 224 includes an image selection module 511, an attribute/pose module 512, a segmentation module 514, a product selection module 516, a fashion profile module 517, an ad generation module 518, a 3D body tracking module 513, a whole-body segmentation module 515, and an ad display module 520.

In one example, the image selection module 511 accesses a database in which is stored various content received from a client device 102 of a given user. For example, the image selection module 511 can access one or more images or videos stored in the database which the user previously posted to a social network, shared with one or more other users via the messaging server system 108, and/or otherwise made the images or videos available to the messaging server system 108, such as by sending the images or videos from a local storage of the client device 102 to the messaging server system 108.

The image selection module 511 processes the set of images or videos to select a subset of images or videos that are suitable for generating one or more advertisements to a target user. For example, the image selection module 511 can exclude from the subset of images or videos any image in the set of images or videos that depicts more than one person or that fail to satisfy an image quality metric. Namely, the image selection module 511 can apply one or more object recognition techniques to the set of images or videos to identify images or videos that include more than one human face. The image selection module 511 can exclude such images or videos from being included in the subset of images or videos that are suitable for generating an advertisement. The image selection module 511 can process the remaining images or videos to identify those images or videos that depict a face that matches facial attributes of the target user. For example, the image selection module 511 can activate a camera of the client device 102 of the target user and capture an image or video of the face of the target user after requesting permission from the target user. The image selection module 511 obtains or extracts one or more features of the face of the target user and uses the extracted features to find images or videos that include a depiction of a face with features that match the extracted features. The image selection module 511 can add such images to the subset of images or videos that are suitable for generating one or more advertisements to the target user.

In some examples, rather than excluding such images or videos from the subset of images of videos, the image selection module 511 can identify a dominant person in the one or more images. The dominant person may have facial characteristics that match facial characteristics of the target user. The dominant person may be depicted more prominently than other persons in the image or video. The image selection module 511 can include the image or video that depicts more than one person in the subset of images or videos that are suitable for generating the advertisements to the target user with an indication of a display position of the dominant person. In such circumstances, the advertisement is generated by modifying the fashion item(s) worn by the dominant person without modifying the fashion items worn by other users in the image that depicts multiple persons.

The image selection module 511 provides one or more images or videos in the subset of images of videos suitable for generating an advertisement to the attribute/pose module 512. The attribute/pose module 512 applies one or more neural networks to the images or videos to determine a pose of the target user depicted in the images or videos. For example, the attribute/pose module 512 determines that the images or videos depict a whole body of the target user, only a face of the target user, only the upper or lower portion of the target user, and/or any other pose of the target user. The attribute/pose module 512 can then segment fashion items worn by the target user in the images or videos. For example, the attribute/pose module 512 can apply one or more trained neural networks to segment the fashion items worn by the target user. Fashion items, as referred to herein, include at least one of an article of clothing, a piece of jewelry, makeup, a hair accessory, or glasses.

In some cases, the attribute/pose module 512 communicates with the segmentation module 514 to segment the fashion items depicted in the images or videos. The segmentation module 514 can initially be trained based on training images to segment a fashion item depicted in an image or video and can then be applied to a new image or video to provide the segmentation of the fashion item.

During training, the segmentation module 514 receives a given training image (e.g., monocular image 501 depicting a real body of a user wearing a fashion item, such as a garment; an image of a user wearing an upper body garment, such as a shirt (short sleeve, t-shirt, or long sleeve), jacket, tank top, sweater, and so forth; a lower body garment, such as pants or a skirt; a whole body garment, such as a dress or overcoat; or any suitable combination thereof or depicting multiple users simultaneously wearing respective combinations of upper body garments, lower body garments, or whole body garments) from fashion item segmentation training image data 502. The segmentation module 514 applies one or more machine learning techniques (e.g., one or more neural networks) on the given training image. The segmentation module 514 extracts one or more features from the given training image to estimate a segmentation of the fashion item(s) worn by the user(s) depicted in the image. For example, the segmentation module 514 obtains the given training image depicting a user wearing a shirt. The first segmentation module 514 (e.g., the machine learning technique) extracts features from the image and segments or specifies which pixels in the image correspond to the shirt worn by the user and which pixels correspond to a background or correspond to parts of the user's body. Namely, the segmentation output by the segmentation module 514 identifies borders of a garment (e.g., the shirt) worn by the user in given training image.

The segmentation module 514 retrieves garment segmentation information associated with the given training image. The segmentation module 514 compares the estimated segmentation (that can include an identification of multiple garments worn by respective users in the image in case there exist multiple users in the image) with the ground truth garment segmentation provided as part of the image data 502. Based on a difference threshold or deviation of the comparison, the segmentation module 514 updates one or more coefficients (of the machine learning techniques or neural networks) and obtains one or more additional training images. After a specified number of epochs or batches of training images have been processed and/or when the difference threshold or deviation reaches a specified value, the segmentation module 514 completes training and the parameters and coefficients of the segmentation module 514 (e.g., the machine learning techniques or neural networks) are stored in the trained machine learning technique(s) 307.

After training, the segmentation module 514 receives an input image 501 (e.g., monocular image depicting a user wearing a fashion item or multiple users wearing respective fashion items) as a single RGB image from a client device 102 or from a storage of the messaging server system 108. The segmentation module 514 applies the trained machine learning technique to the received input image 501 to extract one or more features representing the segmentation of the fashion item(s) depicted in the image 501 and to generate the segmentation of the fashion item.

Once the fashion items are segmented, the attribute/pose module 512 obtains one or more attributes associated with each fashion item worn by the target user. For example, the attribute/pose module 512 can retrieve a color or pattern, style, and size of the fashion item along with whether the fashion item is a full body fashion item (e.g., a dress) or whether the fashion item includes shoulder straps or is a t-shirt. The attribute/pose module 512 can determine whether the fashion item includes a collar or sleeves or any other type of garment attribute.

The attribute/pose module 512 and/or the segmentation module 514 provides the fashion item attributes and/or the pose of the target user to the product selection module 516. The product selection module 516 searches a plurality of product advertisements to identify a product(s) that has fashion item attributes that match the fashion item attributes of the fashion item worn by the target user in the image or video and that matches a pose of the user depicted in the image or video. For example, the pose of the target user may include a whole body pose of the target user and the fashion item attribute may indicate that the target user is wearing a dress or whole body garment. In such cases, the product selection module 516 identifies products that are dresses or whole body garments. As another example, the pose of the target user may include an upper body pose and the fashion item attribute may indicate that the target user is wearing a t-shirt. In such cases, the product selection module 516 identifies products that are t-shirts. As another example, the pose of the target user may include an upper body pose and a lower body pose and the fashion item attribute may indicate that the target user is wearing a t-shirt and jeans. In such cases, the product selection module 516 identifies products that are t-shirts (upper body garments) and products that are jeans (lower body garments).

In other cases, the product selection module 516 identifies products that match the upper body garment (e.g., the t-shirt), such as lower body garments, including pants or skirts or shoes. In these circumstances, the product selection module 516 can access the outfit pairs data 503 to identify matching pairs of outfits. For example, the outfit pairs data 503 can store a list of fashion items (e.g., garments) and the corresponding fashion item attributes that are associated with each fashion item in the list. Namely, a first type of fashion item garment (e.g., a skirt) can be associated with a list of fashion item attributes that match the first type of fashion item garment, such as patterns or colors of shirts or shoes or other types of fashion item garments. The product selection module 516 can search the fashion item attributes in the outfit pairs data 503 to find fashion item attributes that match the fashion item attributes of the fashion item worn by the target user in the image or video. For example, if the target user is wearing a fashion item with fashion item attributes that include straps and upper body garment with a particular pattern or color, the product selection module 516 searches the outfit pairs data 503 to find the best match or closest match to the fashion item attributes. Once the fashion item attributes that match are found, the product selection module 516 obtains the fashion item type or fashion item (e.g., shoes, a skirt or lower body garment) that is associated with the matching fashion item attributes. The fashion item or fashion item type is then used to find products that correspond to the fashion item or fashion item type.

In some examples, the product selection module 516 communicates with a fashion profile module 517 to obtain a fashion profile of the target user. The product selection module 516 can select a given product from a list of products that match the pose and fashion item attributes of the fashion item worn by the target user in an image or video based on the fashion profile of the target user. The fashion profile specifies preferences of the user with respect to fashion items. In some examples, the fashion profile can be generated based on input received directly from the client device 102 of the target user. In some examples, the fashion profile is automatically generated based on analysis of a behavior of the target user. In some examples, a set of videos or images that depict the target user are analyzed to generate the fashion profile. For example, the fashion profile module 517 can identify a plurality of images from the content previously received from the client device 102 of the target user that depict the target user. The fashion profile module 517 determines a plurality of types of fashion items worn by the target user across the plurality of images. For example, the fashion profile module 517 can determine that the target user wears a t-shirt and pants in one set of images and wears a skirt in another set of images. The fashion profile module 517 computes a quantity for each of the plurality of types representing a number of instances of each of the plurality of types across the plurality of images. For example, a separate value can be maintained for each type of fashion item that is detected in the plurality of images. Namely, a first value can represent a first type of fashion item (e.g., skirt) and a second value can represent a second type of fashion item (e.g., t-shirt). Each time the fashion profile module 517 detects a skirt in the plurality of images, the fashion profile module 517 increments the first value representing the first type of fashion item. Similarly, each time the fashion profile module 517 detects a t-shirt in the plurality of images, the fashion profile module 517 increments the second value representing the second type of fashion item.

The fashion profile module 517 can compare the quantity of each of the plurality of types to a threshold value. For example, the fashion profile module 517 compares the first value to a threshold and the second value to the threshold. In response to determining that the first value transgresses the threshold, the fashion profile module 517 adds the first type of fashion item (e.g., skirt) to the fashion profile of the target user. In response to determining that the second value fails to transgress the threshold, the fashion profile module 517 excludes the second type of fashion item (e.g., t-shirt) from the fashion profile of the target user. In this way, the product selection module 516 can select or prioritize products that match the first type of fashion item and de-select or de-prioritize products that match the second type of fashion item. This results in generating advertisements that match fashion preferences of the target user (e.g., recommending or generating advertisements for skirts rather than t-shirts). The product selection module 516 provides the selected product and the images or videos that depict the target user to the ad generation module 518 for generating an advertisement depicting the target user wearing the selected product.

In another example, the fashion profile module 517 can access one or more messages the target user exchanged with another user via the messaging application server. The fashion profile module 517 determines one or more types of fashion items mentioned in the one or more messages and adds the one or more types of fashion items mentioned in the one or more messages to the fashion profile associated with the target user. For example, the target user may have sent a message to a friend indicating or mentioning interest in a skirt or dress needed for an upcoming event that occurs at a particular time/place. In such cases, the fashion profile module 517 can add the skirt or dress to the fashion profile. The fashion profile module 517 can receive an indication of when particular time/place by searching a calendar of the user or messages previously exchanged by the user. The fashion profile module 517 can determine that the event has already taken place when the current time is after the time of the event. In response, the fashion profile module 517 can remove the skirt or dress from the fashion profile of the target user.

The ad generation module 518 receives from the product selection module 516 a selection of a virtualization mode. The virtualization mode options may include a replace the garment with another garment option, recolor pixels of the garment option (e.g., to change the color of each pixel of the image that falls within the garment segmentation with a target pixel color, texture, or animation), apply an animation or video to a region within the garment segmentation (e.g., to replace each pixel of the image that falls within the garment segmentation with a target animation or video), present ripples, sparkles, or particles to the border or portions of the border of the garment segmentation (e.g., to apply one or more AR elements to a region of the image corresponding to the border of the garment segmentation), remove the garment (e.g. set all the pixel values within the garment segmentation to a specified value, such as black or white), apply a contour effect to the garment segmentation, and adjust display locations and occlusion patterns of a virtual garment (e.g., pants) that is displayed next to or adjacent to the garment (e.g., a shirt) corresponding to the garment segmentation. The virtualization mode selection controls the way in which the segmentation of the fashion item worn by the target user affects the display of product in the image relative to the target user.

The ad generation module 518 can adjust the image that depicts the target user based on the product and virtualization mode specified by the product selection module 516. The ad generation module 518 adjusts the way in which the fashion item worn by the target user is presented in the image, such as by changing the color or occlusion pattern of the fashion item worn by the user based on the fashion item segmentation and based on the product selected by the product selection module 516. Ad display module 520 combines the adjustments made by the ad generation module 518 into a content browsing session provided to the target user on the client device 102 of the target user.

The ad generation module 518 can access the 3D body tracking information for the user depicted in the image from the 3D body tracking module 513 to pose the product in a manner that resembles a currently depicted pose of the user's legs corresponding to the product. The ad generation module 518 positions the product (e.g., a pants garment) on top of the user's pants in a manner that blends with a background of the image based on the whole-body segmentation received from the segmentation module 514. In another example, the product can be a t-shirt. In such cases, the ad generation module 518 determines locations of a subset of pixels of the real-world t-shirt worn by the target user. The ad generation module 518 replaces the subset of pixels of the real-world t-shirt with the subset of pixels of the product.

In some examples, the ad generation module 518 can determine that the image that depicts the target user includes a depiction of a first portion and a second portion of the body of the target user. For example, the ad generation module 518 can determine that the image depicts an upper body of the target user (including a torso, arms, and head of the user) and a lower body of the target user (including hips and legs of the user). The ad generation module 518 determines that a first fashion item is depicted in the first portion (e.g., a t-shirt is depicted in the upper body of the target user) and that a second fashion item is depicted in the second portion of the body (e.g., pants are depicted in the lower body of the target user). The ad generation module 518 can determine that the product received from the product selection module 516 corresponds to a lower body of the target user. The product may have been selected by the product selection module 516 based on attributes of the first fashion item (e.g., the t-shirt worn by the user in the image) using the outfit pairs data 503. The ad generation module 518 can modify the image to replace the second fashion item with the selected product while maintaining the first fashion item unchanged. This results in an advertisement that depicts the target user wearing the first fashion item on the first portion of the body and the product on the second portion of the body of the target user.

In some examples, the ad generation module 518 receives multiple images that depict the target user in the same pose but wearing different fashion items. The ad generation module 518 can generate multiple advertisements using the same product selected by the product selection module 516. Namely, the ad generation module 518 can replace the fashion item depicted in each of the multiple images with the selected product. In an example, a first advertisement of the multiple advertisements can be presented to the user during a content browsing session. Input can be received from the user requesting additional views of the product displayed in the first advertisement. In response, a second advertisement of the multiple advertisements can be selected and presented to the user.

In some examples, the image selection module 511 receives a set of image selection criteria from the product selection module 516. Specifically, the product selection module 516 can select a target set of products (e.g., based on criteria received from an advertiser such as based on different bid amounts and/or based on a fashion profile of the target user). The target set of products can be processed to generate image selection criteria, such as fashion attributes associated with the target set of products (e.g., target type of fashion item) and/or pose information associated with the target set of products. The image selection criteria is provided to the image selection module 511 and the attribute/pose module 512 to identify a set of images or videos (previously received from the client device 102 of the target user) that match the fashion attributes associated with the target set of products and/or pose information associated with the target set of products. For example, the target set of products can include a set of t-shirts, in which case the image selection module 511 searches the content of previously received images/videos to identify those that depict the target user wearing a t-shirt or other upper body garment. As another example, the target set of products can include makeup (or makeup palettes), in which case the image selection module 511 searches the content of previously received images/videos to identify those that depict a portrait view of a face of the target. The image selection module 511 can exclude from the set of images or videos those images and videos that depict multiple persons and/or those images that have facial attributes that fail to match facial attributes of the target user. The set of images or videos can then be provided to the ad generation module 518 along with the target set of products to generate the advertisements by modifying the fashion items worn by the target user in the images or videos with the products in the target set of products.

Figure 6:
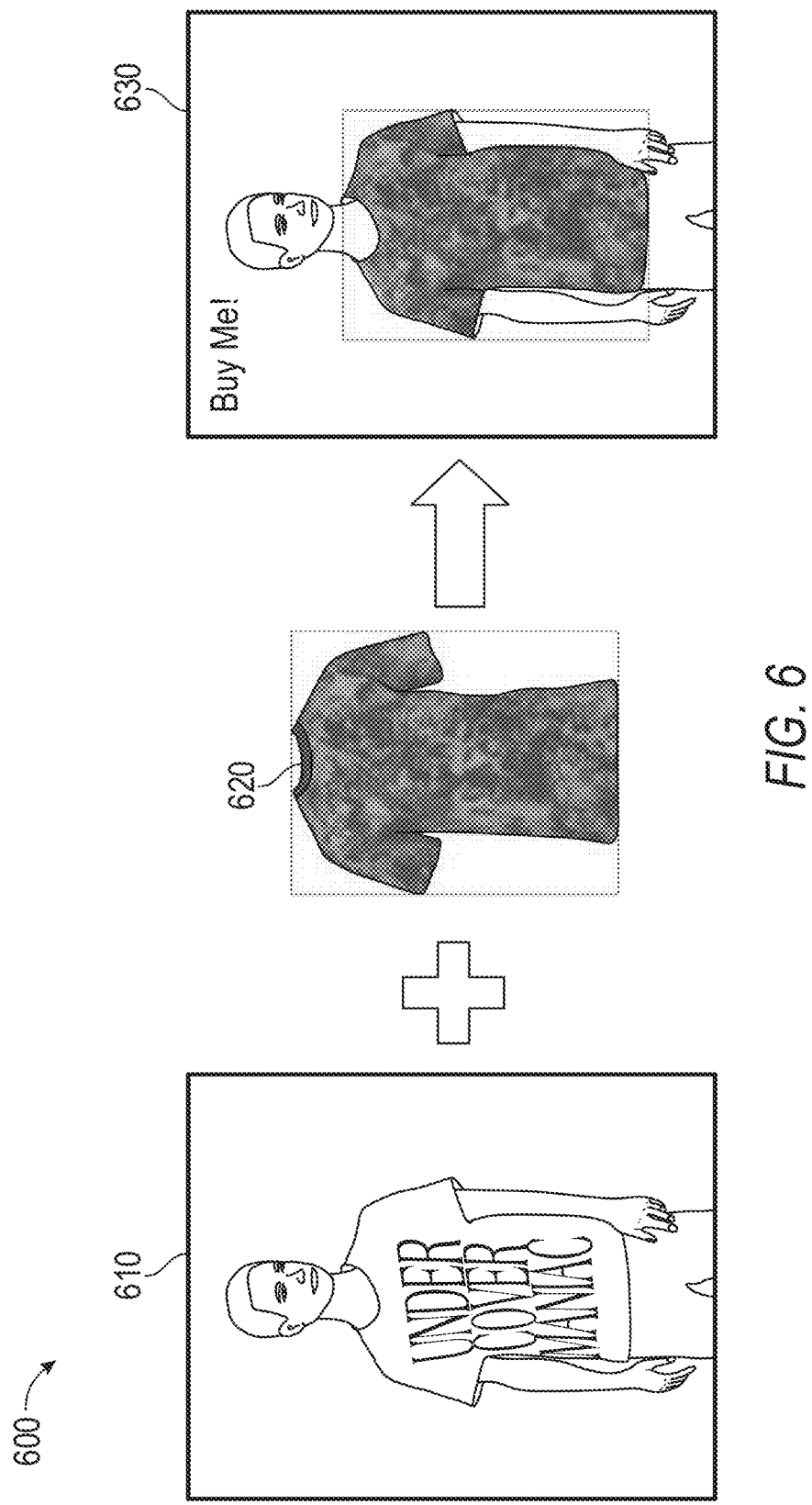
FIGS. 6-9 are diagrammatic representations of outputs of the personalized advertisement system, in accordance with some examples.

FIG. 6 is a diagrammatic representation 600 of outputs of the personalized ADS system 224, in accordance with some examples. Specifically, FIG. 6 shows an image 610 of a target user that is selected which depicts the target user in a first pose and wearing a fashion item with a first set of attributes. The personalized ADS system 224 selects a product 620 that matches the first set of attributes and the first pose of the target user. The personalized ADS system 224 generates an advertisement 630 that replaces the fashion item (e.g., t-shirt) worn by the user in the image 610 with the product 620. The advertisement 630 is presented to the user automatically during a content browsing session provided to the target user on the client device 102 of the target user.

Figure 7:
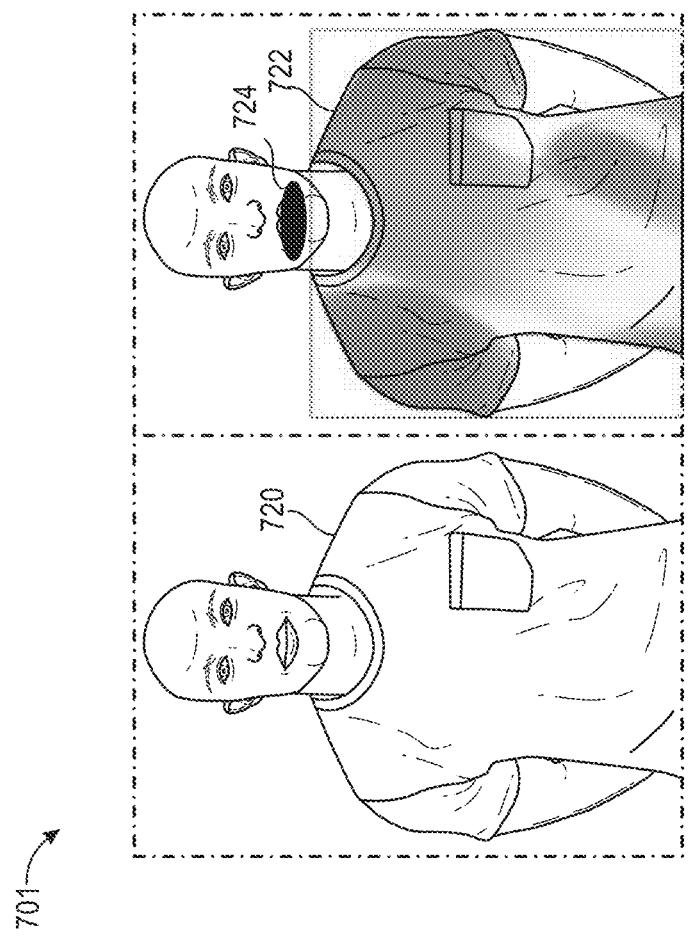
Figure 8:
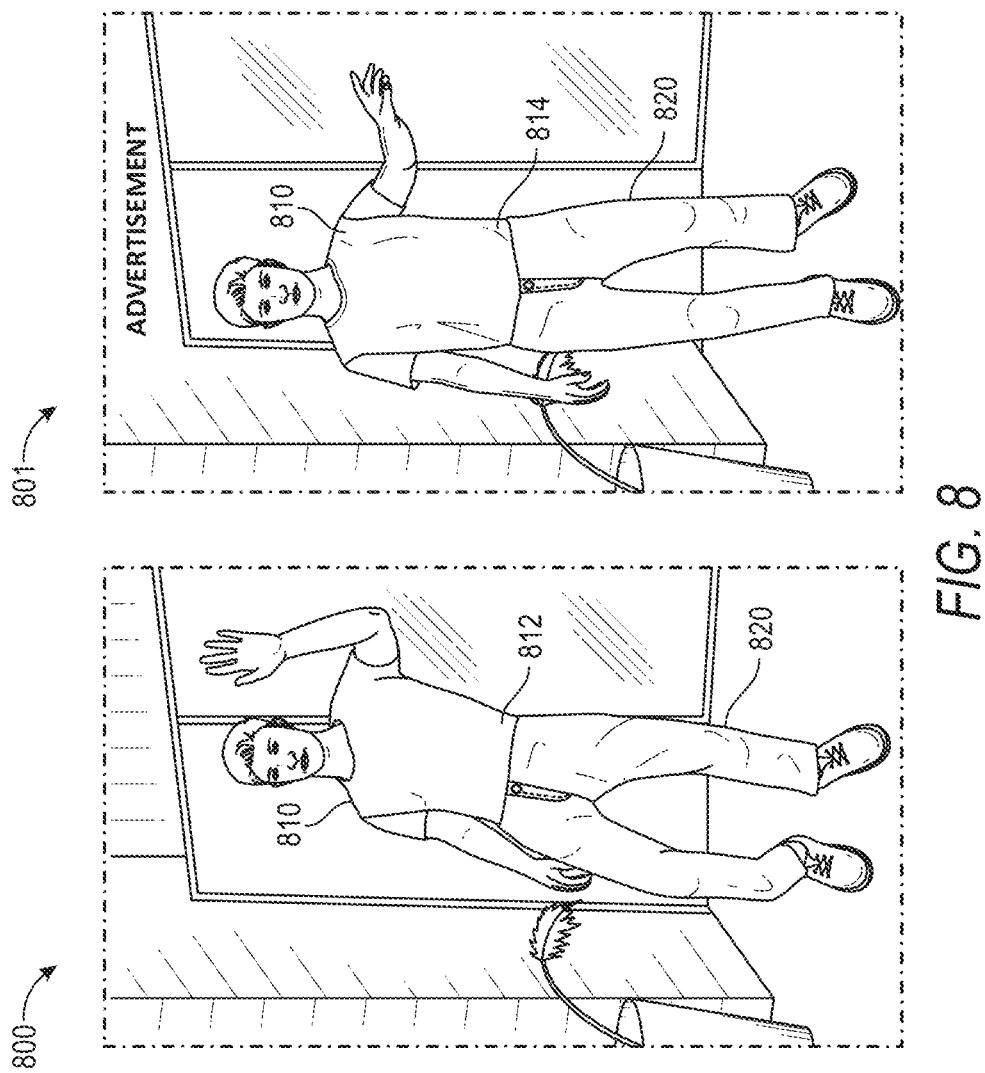
Figure 9:
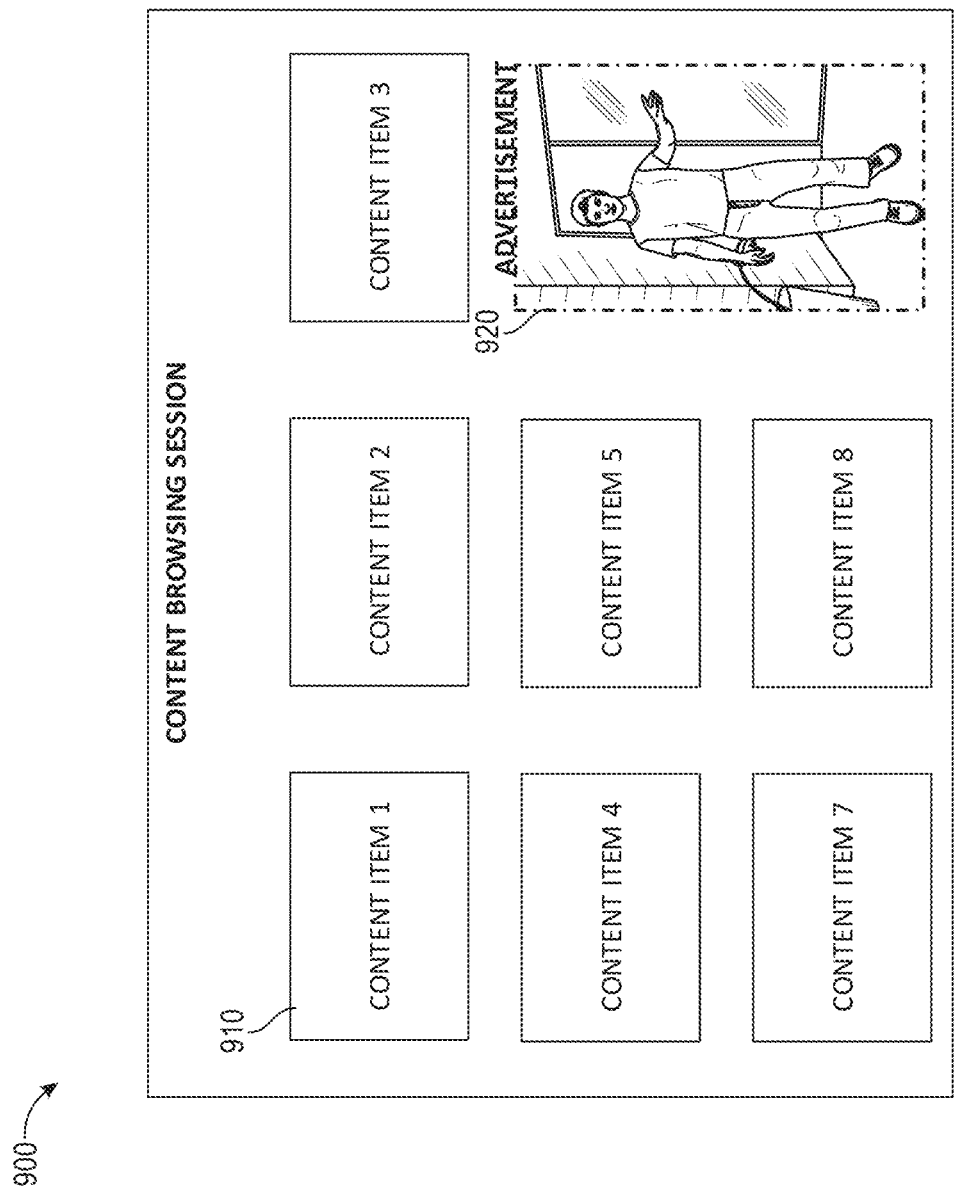

FIGS. 7, 8 and 9 are diagrammatic representations of outputs of the personalized ADS system, in accordance with some examples. In one example, as shown in FIG. 7, the personalized ADS system 224 can modify a pixel color of pixels corresponding to the real-world garment worn by the user in the monocular image or video. Specifically, the personalized ADS system 224 can receive a monocular image 701. The personalized ADS system 224 can generate a fashion item segmentation, as discussed above. The personalized ADS system 224 can determine that the fashion item segmentation of the fashion item worn by the user corresponds to the collection of pixels 720. The personalized ADS system 224 can receive a product that is associated with an advertisement and that corresponds to the fashion item attributes of the fashion item worn by the user. In response, the personalized ADS system 224 generates an image in which the collection of pixels 720 corresponding to the fashion item worn by the user (e.g., the pixels within the fashion item segmentation) have been replaced by the product 722. As another example, the personalized ADS system 224 can receive a product that corresponds to makeup (e.g., lipstick). The personalized ADS system 224 can identify a fashion item segmentation of the lips region of the face and can apply the product 724 to the lips region of the face to generate the advertisement. In this way, the advertisement is generated by applying two products (a lipstick to the lips region of the face and a t-shirt to the upper body of the user) to the image that depicts the user.

FIG. 8 shows an example of displaying a product together with another real-world fashion item according to a first occlusion pattern. For example, a first image 800 depicts a user in a first pose. The user is wearing a real-world garment 810 for which a fashion item segmentation is generated by the personalized ADS system 224. The personalized ADS system 224 may receive a product corresponding to a pants garment 820 to be added to the image 800 to generate the advertisement. In response, the personalized ADS system 224 can access the 3D body tracking information for the user depicted in the image 800 from the 3D body tracking module 513 to pose the pants garment 820 in a manner that resembles a currently depicted pose of the user's legs corresponding to the pants garment 820. The personalized ADS system 224 positions the pants garment on top of the user's legs in a manner that blends with a background of the image 800 based on the whole-body segmentation received from the whole-body segmentation module 515.

The personalized ADS system 224 can select an occlusion pattern for the pants garment in which the virtual pants garment overlaps the real-world shirt in the image. Namely, the personalized ADS system 224 sets the occlusion pattern such that the pants garment 820 overlaps a portion of the real-world garment 810 (e.g., a short sleeve shirt) corresponding to the fashion item segmentation. The personalized ADS system 224 determines which subset of pixels 812 of the real-world garment 810 overlap a subset of pixels of the garment 820. The personalized ADS system 224 replaces the subset of pixels 812 of the real-world garment 810 that are within the overlap region in the fashion item segmentation of the real-world garment 810 with the subset of pixels of the pants garment 820. This gives the illusion that the real-world garment 810 is tucked inside of the pants garment 820 (e.g., the product to be advertised).

As a result, an advertisement 801 is generated that represents the user wearing a first type of garment (e.g., a t-shirt) and a second type of garment (e.g., pants), where the second type of garment is the product that is being advertised. The advertisement 801 shows the subset of pixels 814 of the real-world garment 810 overlapping a subset of pixels of the garment 820.

FIG. 9 is a diagrammatic representation of outputs of the personalized advertisement system, in accordance with some examples. As shown in FIG. 9, a content browsing session 900 is presented on a client device 102 to a target user. The content browsing session includes a plurality of content items 910 (e.g., videos or images) arranged in a mosaic. Among the plurality of content items 910, such as between two or more of the content items 910, (or adjacent to the plurality of content items 910), an advertisement 920 is presented. The advertisement 920 may have been generated by the personalized ADS system 224 by combining a product with a previously received image of the target user and can be presented automatically. The advertisement 920 can include a visual indicator of the product to represent the product being advertised. For example, if the product being advertised is a pair of pants, a highlight or border region can be included in the advertisement 920 around the lower region of the person depicted in the image to identify the product being advertised.

A user selection of the advertisement 920 can be received and, in response, a full screen view of the advertisement 920 can be presented. The full screen view can include an option to view the product alone. In response to receiving selection of the option to view the product alone, the client device 102 can navigate the user to a website featuring the product and allowing the user to purchase the product. In some cases, input can be received from the client device 102 requesting additional views of the product. In response, a second advertisement that has been generated by the personalized ADS system 224 can be retrieved. Namely, the second advertisement can be another image or video previously received from the user that has been modified to replace a fashion item worn by the user in the image or video with the advertised product. An option to purchase the product can be provided in the full screen view. In response to receiving a selection of the option to purchase, an electronic commerce (e-commerce) transaction can be performed to complete purchase of the product being advertised in the advertisement 920.

Figure 10:
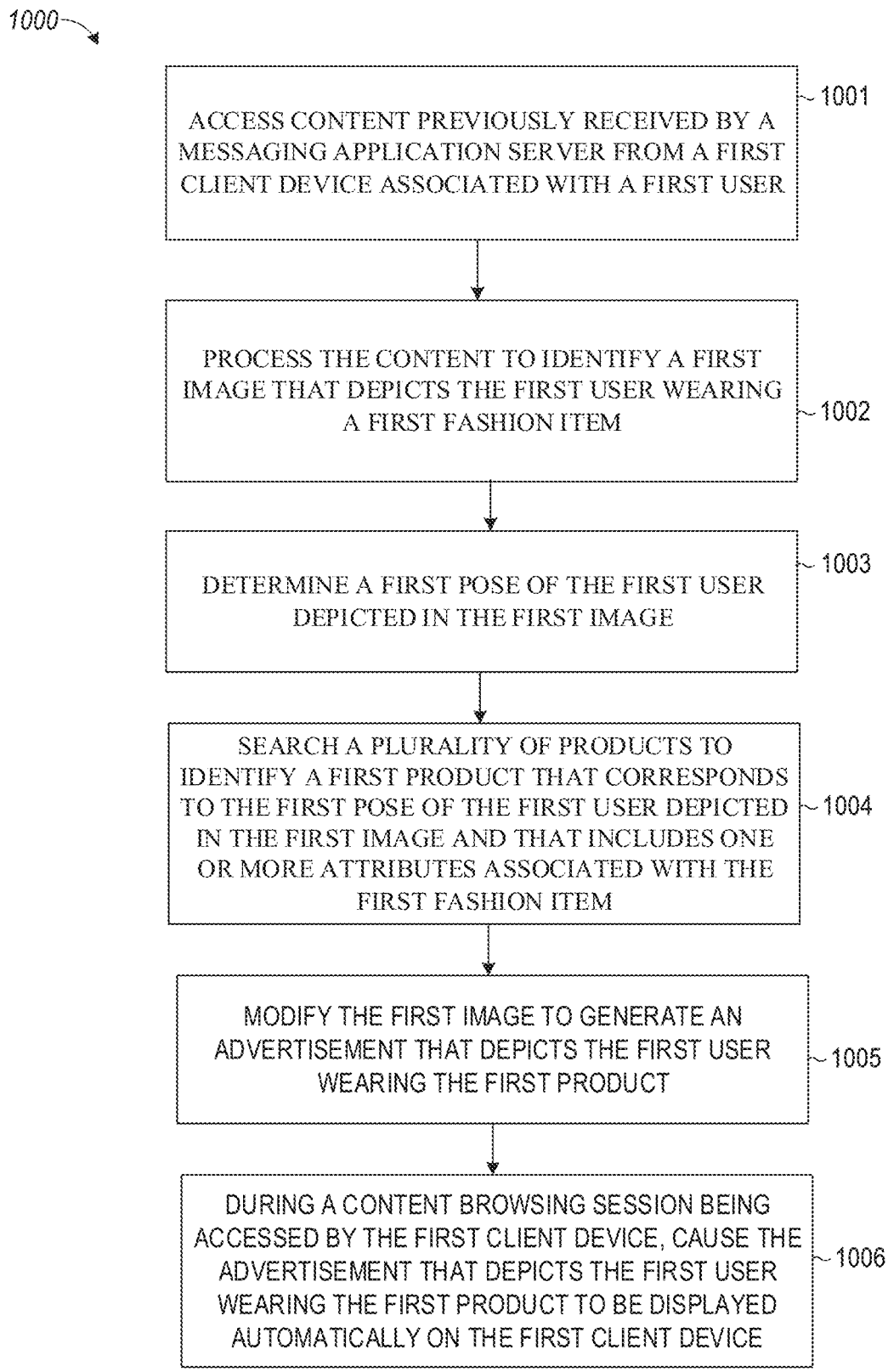
FIG. 10 is a flowchart illustrating example operations of the messaging application server, according to examples.

FIG. 10 is a flowchart of a process 1000 for generating an advertisement, in accordance with some example examples. Although the flowcharts can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the personalized ADS system 224 accesses content previously received by a messaging application server from a first client device associated with a first user, as discussed above.

At operation 1002, the personalized ADS system 224 processes the content to identify a first image that depicts the first user wearing a first fashion item, as discussed above.

At operation 1003, the personalized ADS system 224 determines a first pose of the first user depicted in the first image, as discussed above.

At operation 1004, the personalized ADS system 224 searches, based on the first pose of the first user and the first fashion item, a plurality of products to identify a first product that corresponds to the first pose of the first user depicted in the first image and that includes one or more attributes associated with the first fashion item, as discussed above.

At operation 1005, the personalized ADS system 224 modifies the first image to generate an advertisement that depicts the first user wearing the first product, as discussed above.

At operation 1006, the personalized ADS system 224, during a content browsing session being accessed by the first client device, causes the advertisement that depicts the first user wearing the first product to be displayed automatically on the first client device, as discussed above.

Machine Architecture

Figure 11:
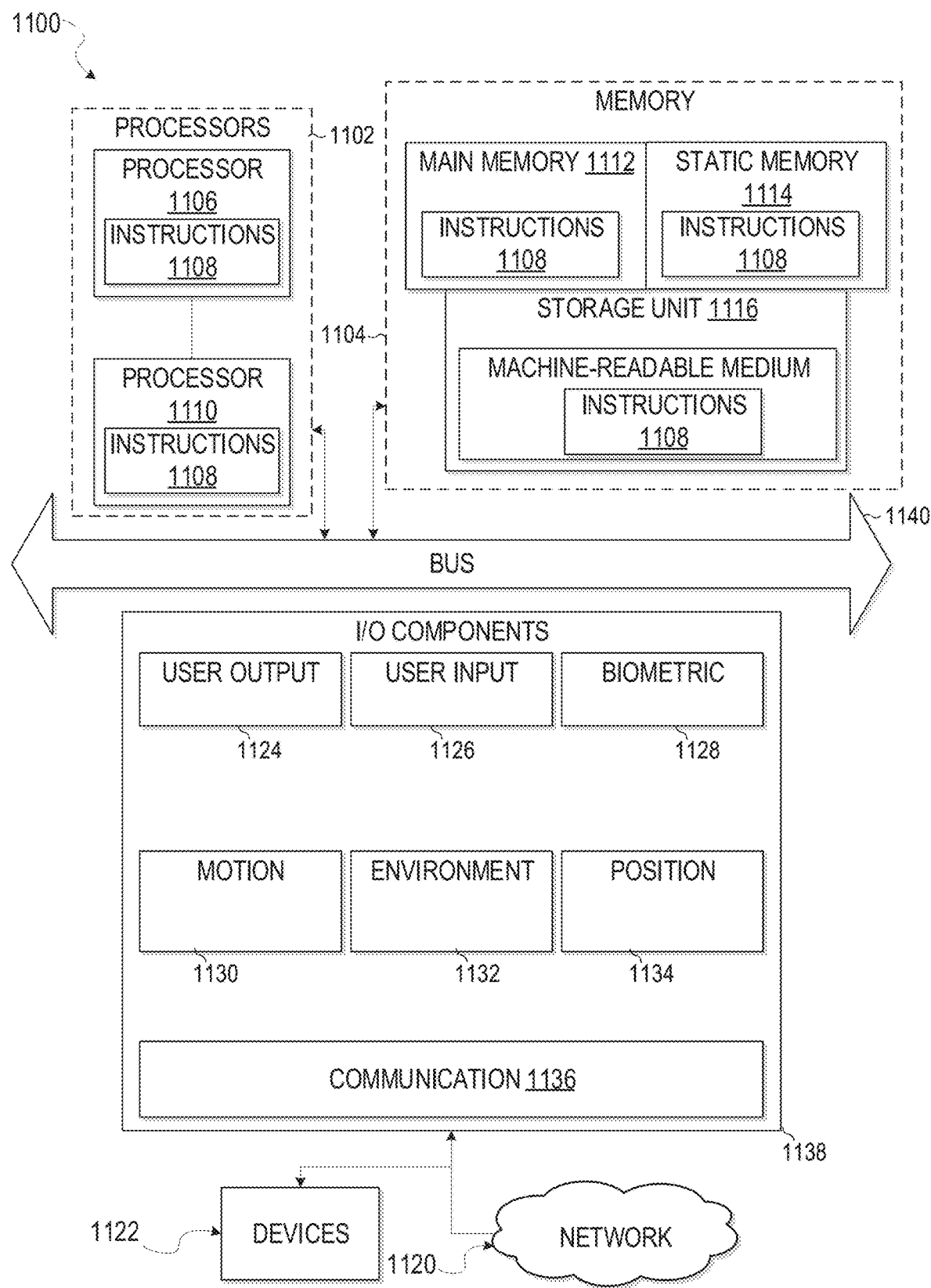
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., HTTP). Similarly, the instructions 1108 may be transmitted or received using a transmission medium via a coupling (e.g., a peer-to-peer coupling) to the devices 1122.

Software Architecture

Figure 12:
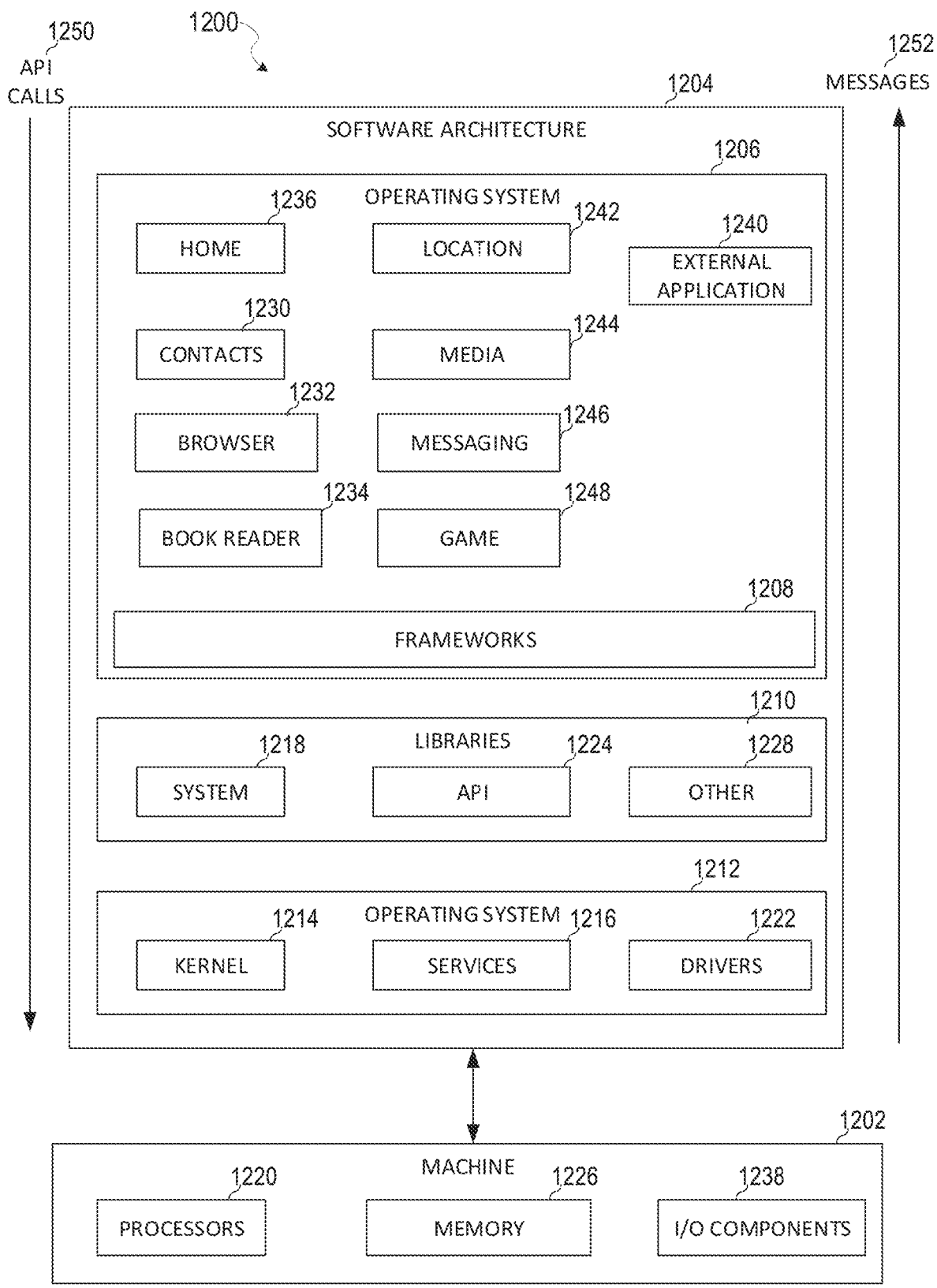
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, STBs, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

selecting a first product type as a target product type in response to determining that a first pose corresponds to a whole first body pose in which a whole-body first type of fashion item is depicted in a first image;

selecting a second product type as the target product type in response to determining that the first pose corresponds to a partial body pose in which a second type of fashion item comprising a partial body fashion item is depicted in the first image;

searching, based on the target product type and the first type of fashion item, a plurality of products to identify a first product that corresponds to the target product type matching the first pose of a first person depicted in the first image and that includes one or more attributes associated with the first type of fashion item;

applying a trained neural network to the first image that has been previously stored by a first device to generate a segmentation to distinguish a portion of the first person depicted in the first image from a background depicted in the first image, the trained neural network being trained by performing operations comprising:

receiving training data comprising a plurality of training monocular images and ground truth segmentations for each of the plurality of training monocular images;

applying a neural network to a first training monocular image of the plurality of training monocular images to estimate a segmentation of a garment worn by a given person depicted in the first training monocular image;

computing a deviation between the estimated segmentation and the ground truth segmentations associated with the first training monocular image;

updating parameters of the neural network based on the computed deviation; and in response to applying the trained neural network to the first image to generate the segmentation, modifying the first image to generate a content item that depicts the first person wearing the first product in which the first product placed on the portion of the first person in a manner that blends with the background of the first image, the modifying of the first image to generate the content item comprising:

calculating characteristic points for a set of elements of the first person to generate a mesh based on the calculated characteristic points;

generating one or more areas on the mesh of the first person;

aligning the one or more areas of the first person with one or more elements of a first augmented reality representation of the first product with a position; and modifying one or more visual properties of the one or more areas to cause the first device to display the first augmented reality representation within the first image at an individual display position relative to the display position of the first person.

2. The method of claim 1, further comprising:
accessing content previously received by an application server from a first device associated with the first person;
processing the content to identify the first image that depicts the first person wearing the first type of fashion item that has been previously stored by the first device; and
without receiving a request from the first person to view an advertisement, during a content browsing session being accessed by the first device, causing, to be displayed, the content item that depicts the first person wearing the first product blended with the background of the first image that has been previously stored by the first device.

3. The method of claim 1, further comprising visually distinguishing a portion of the first image that corresponds to the first product from other portions of the first image to identify the first product being advertised, the visually distinguishing comprising displaying a highlight or border region around the portion of the first image corresponding to the first product.

4. The method of claim 1, further comprising:
displaying a first video in a sequence of videos;
after the first video finishes being displayed, obtaining the content item that depicts the first person wearing the first product that has been previously generated;
automatically presenting the content item for a specified period of time; and
after the content item that depicts the first person wearing the first product has been presented for the specified period of time, automatically displaying a second video in a sequence of videos.

5. The method of claim 1, further comprising:
storing a database that includes a plurality of matching outfit pairs, each of the plurality of matching outfit pairs comprising a given product of the plurality of products and an associated set of attributes that match the given product; and
searching the database to determine that the set of attributes associated with the first product includes at least one of the one or more attributes of the first type of fashion item.

6. The method of claim 1, further comprising:
determining that the first image depicts a first portion and a second portion of a body of the first person, wherein the first type of fashion item is depicted in the first portion of the body of the first person;
wherein a second fashion item is depicted in the second portion of the body of the first person; and
generating the content item by replacing the second fashion item with the first product in the second portion of the body of the first person while maintaining a depiction of the first type of fashion item on the first portion of the body of the first person.

7. The method of claim 1, further comprising:
receiving a set of products associated with advertisements;
generating a set of image selection criteria based on the set of products; and
searching content based on the set of image selection criteria to identify a plurality of images, wherein the first image is selected from the plurality of images.

8. The method of claim 7, wherein the set of image selection criteria comprises a target pose and a target type of fashion item; and wherein the set of image selection criteria comprises an image quality criterion.

9. The method of claim 7, further comprising:
modifying the plurality of images to generate a plurality of advertisements that depict the first person wearing the first product, the plurality of advertisements including the advertisement displayed on the first device;
after causing the content item to be displayed automatically on the first device, receiving a request for additional views of the first person wearing the first product; and
in response to receiving the request for the additional views, causing another advertisement of the plurality of advertisements that depicts the first person wearing the first product to be displayed on the first device.

10. The method of claim 7, further comprising:
selecting an occlusion pattern for the first product, the occlusion pattern controlling which subset of pixels of a real-world garment worn by the first person is overlapped by a subset of pixels of the first product, wherein the subset of pixels of the real-world garment that are within an overlap region are replaced with the subset of pixels of the first product, the real-world garment corresponding to a first type of fashion item worn on a first body part and the first product corresponding to a second type of fashion item worn on a second body part.

11. The method of claim 7, wherein the set of products include makeup; and wherein the set of image selection criteria comprises a portrait view of a face, further comprising:
searching the content to identify the plurality of images that depicts the portrait view of the face of the first person.

12. The method of claim 1, further comprising:
obtaining a plurality of images; and
generating a first set of target images by:
applying one or more object recognition processes to the plurality of images to identify more than one human face in a subset of images;
removing the subset of images from the plurality of images in response to applying the one or more object recognition processes for detecting more than one human face in the subset of images; and
applying facial recognition to the plurality of images from which the subset of images has been removed to select for inclusion in the first set of target images any image that depicts a known face of the first person.

13. The method of claim 1, further comprising:
obtaining a plurality of images;
generating a first set of target images by:
identifying from the plurality of images one or more images that depicts more than one person;
identifying a dominant person in the one or more images, the dominant person having facial characteristics that match facial characteristics of the first person or being depicted more prominently than other persons; and
modifying a fashion item worn by the dominant person in the one or more images to generate the content item that depicts the dominant person wearing the first product.

14. The method of claim 1, wherein the content item that depicts the first person wearing the first product is presented among a set of media items in an interactive mosaic display.

15. The method of claim 1, wherein the first product type comprises a dress that is selected in response to detecting a dress being depicted as being worn by the first person in the first image, and wherein the first product type comprises a shirt that is selected in response to detecting a shirt being depicted as being worn by the first person in the first image.

16. The method of claim 1, further comprising:
determining a fashion profile associated with the first person;
searching, based on the fashion profile associated with the first person, the plurality of products to identify a set of products that match the fashion profile; and
searching, based on the first pose of the first person and the first type of fashion item, the set of products to identify the first product that corresponds to the first pose of the first person depicted in the first image and that includes one or more attributes associated with the first type of fashion item.

17. The method of claim 16, further comprising:
identifying a plurality of images that depict the first person, determining a plurality of types of fashion items worn by the first person across the plurality of images;
computing a quantity for each of the plurality of types representing a number of instances of each of the plurality of types across the plurality of images;
comparing the quantity of each of the plurality of types to a threshold value; and
in response to determining that a first of the plurality of types transgresses the threshold value, adding the first of the plurality of types to the fashion profile associated with the first person.

18. The method of claim 16, further comprising:
accessing one or more messages the first person exchanged with another user via an application server;
determining one or more types of fashion items mentioned in the one or more messages, the one or more messages being associated with an event that occurs at a particular time;
adding the one or more types of fashion items mentioned in the one or more messages to the fashion profile associated with the first person;
determining that a current time is after the particular time at which the event occurs; and
in response to determining that the current time is after the particular time at which the event occurs, removing the one or more types of fashion items mentioned in the one or more messages from the fashion profile associated with the first person.

19. A system comprising:
at least one processor; and
a memory component having instructions stored thereon, when executed by the at least one processor, causes the at least one processor to perform operations comprising:
selecting a first product type as a target product type in response to determining that a first pose corresponds to a whole first body pose in which a whole-body first type of fashion item is depicted in a first image;
selecting a second product type as the target product type in response to determining that the first pose corresponds to a partial body pose in which a second type of fashion item comprising a partial body fashion item is depicted in the first image;
searching, based on the target product type and the first type of fashion item, a plurality of products to identify a first product that corresponds to the target product type matching the first pose of a first person depicted in the first image and that includes one or more attributes associated with the first type of fashion item;
applying a trained neural network to the first image that has been previously stored by a first device to generate a segmentation to distinguish a portion of the first person depicted in the first image from a background depicted in the first image, the trained neural network being trained by performing operations comprising:
receiving training data comprising a plurality of training monocular images and ground truth segmentations for each of the plurality of training monocular images;
applying a neural network to a first training monocular image of the plurality of training monocular images to estimate a segmentation of a garment worn by a given person depicted in the first training monocular image;
computing a deviation between the estimated segmentation and the ground truth segmentations associated with the first training monocular image;
updating parameters of the neural network based on the computed deviation; and
in response to applying the trained neural network to the first image to generate the segmentation, modifying the first image to generate a content item that depicts the first person wearing the first product in which the first product placed on the portion of the first person in a manner that blends with the background of the first image, the modifying of the first image to generate the content item comprising:
calculating characteristic points for a set of elements of the first person to generate a mesh based on the calculated characteristic points;
generating one or more areas on the mesh of the first person;
aligning the one or more areas of the first person with one or more elements of a first augmented reality representation of the first product with a position; and
modifying one or more visual properties of the one or more areas to cause the first device to display the first augmented reality representation within the first image at an individual display position relative to the display position of the first person.

20. A non-transitory computer-readable storage medium having stored thereon, instructions when executed by at least one processor, causes the at least one processor to perform operations comprising:
selecting a first product type as a target product type in response to determining that a first pose corresponds to a whole first body pose in which a whole-body first type of fashion item is depicted in a first image;
selecting a second product type as the target product type in response to determining that the first pose corresponds to a partial body pose in which a second type of fashion item comprising a partial body fashion item is depicted in the first image;
searching, based on the target product type and the first type of fashion item, a plurality of products to identify a first product that corresponds to the target product type matching the first pose of a first person depicted in the first image and that includes one or more attributes associated with the first type of fashion item;
applying a trained neural network to the first image that has been previously stored by a first device to generate a segmentation to distinguish a portion of the first person depicted in the first image from a background depicted in the first image, the trained neural network being trained by performing operations comprising:

receiving training data comprising a plurality of training monocular images and ground truth segmentations for each of the plurality of training monocular images;

applying a neural network to a first training monocular image of the plurality of training monocular images to estimate a segmentation of a garment worn by a given person depicted in the first training monocular image;

computing a deviation between the estimated segmentation and the ground truth segmentations associated with the first training monocular image;

updating parameters of the neural network based on the computed deviation; and in response to applying the trained neural network to the first image to generate the segmentation, modifying the first image to generate a content item that depicts the first person wearing the first product in which the first product placed on the portion of the first person in a manner that blends with the background of the first image, the modifying of the first image to generate the content item comprising:

calculating characteristic points for a set of elements of the first person to generate a mesh based on the calculated characteristic points;

generating one or more areas on the mesh of the first person;

aligning the one or more areas of the first person with one or more elements of a first augmented reality representation of the first product with a position; and modifying one or more visual properties of the one or more areas to cause the first device to display the first augmented reality representation within the first image at an individual display position relative to the display position of the first person.

* * * * *